UNITED STATES PATENT OFFICE.

OSCAR FRÖLICH, OF CHARLOTTENBURG, MAX HUTH, OF HALENSEE, AND ARTHUR EDELMANN, OF CHARLOTTENBURG, GERMANY, ASSIGNORS TO SIEMENS & HALSKE AKTIENGESELLSCHAFT, OF BERLIN, GERMANY.

SEPARATING PROCESS FOR ORES.

SPECIFICATION forming part of Letters Patent No. 692,008, dated January 28, 1902.

Application filed September 5, 1901. Serial No. 74,384. (No specimens.)

*To all whom it may concern:*

Be it known that we, OSCAR FRÖLICH, physicist, a citizen of the Swiss Republic, residing at 68 Grolmannstrasse, Charlottenburg, near Berlin, MAX HUTH, chemist, a subject of the German Emperor, residing at 132 Kurfürstendamm, Halensee, near Berlin, and ARTHUR EDELMANN, mining-engineer, a subject of the German Emperor, residing at 6 Marchstrasse, Charlottenburg, near Berlin, Germany, have invented certain new and useful Improvements in Separating Processes for Ores; and we do hereby declare the following to be a full, clear, and exact description of the invention, such as will enable others skilled in the art to which it appertains to make and use the same.

According to the newly-developed method for manufacturing sulfuric anhydrid a mixture of sulfur dioxid and air is well dried and passed over heated ferric oxid. In this manner sulfuric anhydrid is directly formed. The present invention relates to a process in which the same chemical change is applied to another purpose—namely, to the conversion by a dry method of metals which occur in many ores together with iron into sulfates. Such metals are, for example, magnesium, nickel, and copper. In this process there may be used ores or their products which contain iron not only as oxid, but as silicate or carbonate, and the same applies to the other metals—magnesium, nickel, or copper—which the ore contains. Silicates are changed in this process into sulfates and silica. Carbonates have their carbon dioxid expelled. In this process, therefore, sulfid ores are first roasted, so that they contain, essentially, oxids, while ores containing silicates and carbonates need no preliminary treatment. The pulverized ore is then heated to a certain temperature, determined by experiment, and a previously-heated and, if necessary, dry mixture of sulfur dioxid and air in the proper proportion is passed over it, the ore being kept in motion, so that every part thereof may come into intimate contact with the gas-current and access of cold air being prevented. It is advantageous to interrupt frequently the sulfating process and to leach the ore with water. The part already sulfated is thus separated, while the non-sulfated part becomes more easily and powerfully attacked by the current of gas. When several metals are present in the ore besides iron, the sulfating should be effected successively at several different temperatures. If the right degree of temperature is selected, the iron is sulfated but little or not at all, whereas the rest of the metals are wholly or nearly wholly sulfated. By then leaching with water there is obtained a solution of the sulfates of the rest of the metals, while all or nearly all the iron remains in the ore. The current of gas after it has left the ore and has been converted into sulfuric anhydrid is led into water, so that dilute sulfuric acid is formed, or it may be collected as anhydrid without addition of water. The temperature to which the ore is heated depends in general on the nature of the ore. In most cases, however, the temperature lies within limits of 500° to 1,000° centigrade. If the ore contains only one metal to be leached in addition to the iron, the sulfating is allowed to proceed at that temperature at which the said metal is rapidly sulfated without any sulfation of the iron. If the ore contains, in addition to the iron, two or more metals to be leached out, the temperature is selected at first so that it is below the temperature of decomposition of the sulfate of one of these metals, but above the decomposition temperature of the sulfates of the rest of the metals. In this manner only this particular metal is sulfated and can be extracted by leaching. A similar selection of temperature is made for the second sulfation, whereby only one of the remaining metals is sulfated and extracted. The same selective process is adopted for the rest of the metals, and thus practically all of them are separately sulfated and extracted without any appreciable attack of the iron, whose sulfate has a comparatively low temperature of decomposition. When a considerable part of the metals to be won remains in the ore in an unsulfated condition, the ore is finally treated with the dilute sulfuric acid made during the process.

Whether the air is to be dry or not must be decided by experiment. Contrary to experience in the process for making sulfuric acid referred to above, it appears that in many cases drying of the air is not essential. If the sulfuric acid contained in the sulfates is recoverable in any manner, the same sulfuric or sulfurous acid can always be used again in the case of ores which are not pyritic. In the case of pyritic ores also there may be in practice a circulation of a certain proportion of sulfur, while apart from this constant proportion the sulfur of the ore is obtained as sulfuric anhydrid or as aqueous sulfuric acid. The best working dilution of the sulfur dioxid by air is ascertained for each ore.

It will thus be seen that my invention consists in heating ores containing iron together with another metal or metals or, to define these ores in other words, containing iron among a plurality of metals in a combined form—that is to say, in the form of oxids, silicates, carbonates, or the like—to a temperature below the decomposition temperature of the particular metal to be sulfated, but above the temperature of the sulfate of any other metal occurring in the ore, and then passing over the heated ore a preferably-heated mixture containing sulfur dioxid and oxygen, previously dried, if necessary.

It also consists in separating, preferably by leaching with water, the resultant product and then repeating these steps until the different metals have been separated.

It furthermore consists in such further features and steps and subprocesses, singly and in combination, as are defined and pointed out in the claims forming part of and appended to this specification.

The most important cases in which the new process is applied are as follows:

First. Cupreous iron pyrites: This ore is submitted to an oxidizing roasting until the copper is practically converted into sulfate and oxid. The sulfate is then leached out and the residue is treated by the dry sulfating process. After the leaching nearly all the copper is obtained as sulfate, while the residue contains virtually only ferric oxid. The roasting and sulfating can under the proper conditions be combined into one operation. In a similar manner ores containing, besides iron, copper, as malachite or silicate, may be treated.

Second. Iron pyrites containing copper and nickel: This ore is treated as in the former case, but at two different temperatures, the first being the higher of the two in order that nickel alone may be sulfated and the second a lower temperature, so that only the copper may be sulfated. The solution obtained by leaching after the first sulfation contains, therefore, practically only nickel, while the solution after the second sulfation contains practically only copper.

Third. Ores containing iron, nickel, and magnesium as silicates: The treatment in this case is essentially the same as that of the preceding examples, with this difference; that in the first sulfation at the higher temperature only magnesium is made soluble, while in the second sulfation at a lower temperature virtually nickel alone is sulfated. Thus there are obtained practically separate solutions of these two metals.

Having now particularly described and ascertained the nature of our said invention and the manner in which the same is to be performed, we declare that what we claim is—

1. In the art of separating metals from ores containing iron among a plurality of metals existing therein in a combined form, the process which consists in heating the ore to a temperature below the decomposition temperature of the sulfate of the metal to be sulfated, but above the decomposing temperature of the sulfate of any other metal existing in the ore and then passing over it a gas mixture containing sulfur dioxid and oxygen.

2. In the art of separating metals from ores containing iron among a plurality of metals existing therein in a combined form, the process which consists in heating the ore to a temperature below the decomposition temperature of the sulfate of the metal to be sulfated but above the decomposing temperature of the sulfate of any other metal existing in the ore, and then passing over it a heated mixture of sulfur dioxid and air.

3. In the art of separating metals from ores containing iron and other metals existing therein in a combined form, the process which consists in heating the ore to a temperature below the decomposition temperature of the sulfate of the metal to be sulfated, but above the decomposing temperature of the sulfates of the other metals, then passing over it a gas mixture containing sulfur dioxid and oxygen, then separating the resultant sulfate and repeating the above steps for each of the other metals susceptible of sulfation.

4. In the art of separating metals from ores containing iron and other metals existing therein in a combined form, the process which consists in heating the ore to a temperature below the decomposition temperature of the sulfate of the metal to be sulfated, but above the decomposing temperature of the sulfates of the other metals, then passing over it a heated gas mixture containing sulfur dioxid and air, then leaching the ore with water and repeating the above steps for another of the metals and so on.

5. In the art of separating metals from ores of the character hereinbefore described, the process which consists in heating the ore to a temperature below the decomposing temperature of the sulfate of the metal to be sulfated, but above the decomposing temperature of any other metal existing in the ore and then passing over it a heated and dry mixture of sulfur dioxid and air.

6. In the art of separating metals from ores of the character hereinbefore described, the process which consists in heating the ore to a temperature below the decomposing temperature of the sulfate of the metal to be sulfated, but above the decomposing temperature of any other metal existing in the ore and then passing over it a heated and dry mixture of sulfur dioxid and air, then separating the resultant sulfate and repeating the above step for another of the metals and so on.

7. In the art of separating metals from ores of the character hereinbefore described, the process which consists in heating the ore to a temperature below the decomposing temperature of the sulfate of the metal to be sulfated, but above the decomposing temperature of any other metal existing in the ore and then passing over it a heated and dry mixture of sulfur dioxid and air, then separating the resultant sulfate and repeating the above steps for another of the metals and so on, then leaching the ore with water and repeating the above steps for another of the metals and so on.

8. In the art of separating metals from ores of the character hereinbefore set forth, the process which consists in heating the ore to a temperature between 500° to 1,000° centigrade, and passing over it a heated mixture containing sulfur dioxid and oxygen.

9. In the art of separating metals from ores of the character hereinbefore specified, the process which consists in heating the ore to a temperature between 500° and 1,000° centigrade, and passing over it a heated and dried mixture of sulfur dioxid and air.

In testimony whereof we have affixed our signatures in presence of two witnesses.

OSCAR FRÖLICH.
MAX HUTH.
ARTHUR EDELMANN.

Witnesses:
WOLDEMAR HAUPT,
HENRY HASPER.